United States Patent
Komiya et al.

(10) Patent No.: US 11,040,476 B2
(45) Date of Patent: Jun. 22, 2021

(54) STRETCH-BLOW FORMED POLYESTER CONTAINER AND METHOD OF PRODUCING THE SAME

(71) Applicant: TOYO SEIKAN CO., LTD., Tokyo (JP)

(72) Inventors: Atsushi Komiya, Yokohama (JP); Ryouta Ishii, Yokohama (JP); Hiroki Yasukawa, Yokohama (JP); Yuu Yamazaki, Yokohama (JP); Yuuki Kurihara, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 137 days.

(21) Appl. No.: 16/313,779

(22) PCT Filed: Jun. 27, 2017

(86) PCT No.: PCT/JP2017/023551
§ 371 (c)(1),
(2) Date: Dec. 27, 2018

(87) PCT Pub. No.: WO2018/003790
PCT Pub. Date: Jan. 4, 2018

(65) Prior Publication Data
US 2019/0168439 A1 Jun. 6, 2019

(30) Foreign Application Priority Data

Jun. 28, 2016 (JP) .............................. JP2016-127784
Jul. 12, 2016 (JP) .............................. JP2016-137377
Nov. 21, 2016 (JP) .............................. JP2016-225662

(51) Int. Cl.
*B29C 49/12* (2006.01)
*B65D 1/02* (2006.01)
(Continued)

(52) U.S. Cl.
CPC .......... *B29C 49/12* (2013.01); *B29C 49/0005* (2013.01); *B65D 1/02* (2013.01);
(Continued)

(58) Field of Classification Search
CPC ................ B29C 49/12; B29C 49/0005; B29C 2049/4638; B65D 1/02; B65D 1/0246;
(Continued)

(56) References Cited

U.S. PATENT DOCUMENTS

2003/0104146 A1\* 6/2003 Kikuchi .............. B29C 49/0005
428/34.7
2004/0026827 A1 2/2004 Dairanieh et al.
(Continued)

FOREIGN PATENT DOCUMENTS

CN 1665669 A 9/2005
JP 2006-137058 A 6/2006
(Continued)

OTHER PUBLICATIONS

International Search Report for PCT/JP2017/023551 dated Aug. 15, 2017 [PCT/ISA/210].
(Continued)

*Primary Examiner* — Michael C Miggins
(74) *Attorney, Agent, or Firm* — Sughrue Mion, PLLC

(57) ABSTRACT

A stretch-blow-formed polyester container having an average thickness of not more than 280 μm in the body portion thereof, and effectively suppressing the deformation that is caused when the container is filled with a content of a high temperature, wherein in the measurement of dynamic viscoelastic properties in an axial direction at a central portion of said body portion, a tan δ peak value and a tan δ peak temperature at the peak value satisfy either; (i) the tan δ peak value is in a range of 0.23 to 0.29, and the tan δ peak temperature at the peak value is in a range of 111 to 118°
(Continued)

■: Examples 1-6
▲: Comparative Examples 1-3
△: Comparative Example 4
○: Thick heat-resistant bottles C.δ; or (ii) the tan δ peak value is in a range of less than 0.25, and the tan δ peak temperature at the peak value is in a range of not lower than 119° C.

6 Claims, 3 Drawing Sheets

(51) Int. Cl.
    *B29C 49/00* (2006.01)
    *B29K 67/00* (2006.01)
    *B29C 49/46* (2006.01)
    *B29K 667/00* (2006.01)
    *B29L 31/00* (2006.01)

(52) U.S. Cl.
    CPC .... *B65D 1/0246* (2013.01); *B29C 2049/4638* (2013.01); *B29K 2067/00* (2013.01); *B29K 2667/00* (2013.01); *B29L 2031/7158* (2013.01); *B65D 1/0207* (2013.01)

(58) Field of Classification Search
    CPC .............. B65D 1/0207; B29K 2067/00; B29K 2667/00; B29L 2031/7158
    See application file for complete search history.

(56) References Cited

U.S. PATENT DOCUMENTS

| | | |
|---|---|---|
| 2009/0304969 A1 | 12/2009 | Takuya et al. |
| 2010/0104785 A1 | 4/2010 | Toshiki et al. |
| 2012/0189793 A1 | 7/2012 | Yota et al. |
| 2015/0076105 A1 | 3/2015 | Sato et al. |

FOREIGN PATENT DOCUMENTS

| | | |
|---|---|---|
| JP | 2006-306452 A | 11/2006 |
| JP | 2011-195188 A | 10/2011 |
| JP | 2012-012487 A | 1/2012 |
| JP | 2014-008636 A | 1/2014 |
| WO | 2008/044280 A1 | 4/2008 |
| WO | 2008/044793 A1 | 4/2008 |
| WO | 2008/123401 A1 | 10/2008 |

OTHER PUBLICATIONS

Communication dated Oct. 28, 2019, from the State Intellectual Property Office of the P.R. of China in Application No. 201780040407.9.

Communication dated Oct. 29, 2019 from the European Patent Office in application No. 17820144.8.

* cited by examiner

■: bottles of the invention
○: thick heat-resistant bottles
●: two-step blow-formed bottles
△: heat- and pressure-resistant bottles ■ : Examples 1-6
▲ : Comparative Examples 1-3
△ : Comparative Example 4
○ : Thick heat-resistant bottles

STRETCH-BLOW FORMED POLYESTER CONTAINER AND METHOD OF PRODUCING THE SAME

CROSS REFERENCE TO RELATED APPLICATIONS

This application is a National Stage of International Application No. PCT/JP2017/023551 filed Jun. 27, 2017, claiming priority based on Japanese Patent Application Nos. 2016-127784 filed Jun. 28, 2016, 2016-137377 filed Jul. 12, 2016 and 2016-225662 filed Nov. 21, 2016.

TECHNICAL FIELD

This invention relates to a stretch-blow-formed polyester container having a reduced thickness and to a method of producing the same. More specifically, the invention relates to a stretch-blow-formed heat-resistant polyester container which is light in weight and having a reduced thickness, and is adapted to being filled at high temperatures.

BACKGROUND ART

A stretch-blow-formed polyester container obtained by biaxially stretch-blow-forming a polyester preform features excellent transparency and lightness and, therefore, has been widely used for containing a variety of kinds of beverages.

From the standpoint of saving resources, reducing costs and maintaining environment in recent years, it has been desired to further reduce the thickness of even the stretch-blow-formed polyester containers. In the heat-resistant containers, however, a further reduction in the thickness makes it difficult to maintain the resistance against the heat. That is, the container deforms greatly if it is filled with the content at a temperature of as high as 80° C. or higher and, therefore, limitation has been imposed on reducing the thickness.

That is, as for improving the resistance against the heat of the stretch-blow-formed polyester container, there has generally and widely been used a means for heat-treating (heat-setting) the container after it has been blow-formed. With the stretch-blow-formed thin polyester container having an average thickness which is as small as not more than 280 μm in the container body portion, however, the container may deform due to the heat at the time of heat-set, and the crystallization based on the heat-set cannot be fully executed. When filled with the content at a high temperature, therefore, the container cannot be prevented from being deformed. Therefore, the thickness of the container body portion could not be reduced to a sufficient degree.

As a prior art for improving the resistance against the heat of the stretch-blow-formed polyester container, the following patent document 1 is proposing a polyester container having a tan δ peak temperature which is not higher than 113° C. and a tab δ absolute value which is not more than 0.18 in the measurement of its dynamic viscoelastic properties in the vertical direction of the body portion of the container.

Upon being blow-stretched and heat-set so as to satisfy predetermined dynamic viscoelastic properties, the above polyester container exhibits excellent resistance against being thermally deformed, e.g., exhibits resistance against being thermally deformed so as to be capable of withstanding even a high-temperature sterilization processing (retort processing). By controlling the dynamic viscoelastic properties of the container to lie within a predetermined range, therefore, the patent document 1 is realizing excellent resistance against being thermally deformed so as to withstand even the retort processing.

However, the technology disclosed in the above patent document 1 has been designed to be adapted to blow-formed thick polyester containers, but could not be adapted to blow-formed polyester containers which are thin and light in weight since the containers could be deformed due to the heat-set at the time of forming.

Prior Art Document

Patent Document

Patent document 1: JP-A-2006-306452

Outline of the Invention

Problems that the Invention is to Solve

It is, therefore, an object of the present invention to provide a stretch-blow-formed polyester container having an average thickness of as small as not more than 280 μm in the body portion thereof, and effectively suppressing the deformation that is caused when the container is filled with a content of a high temperature.

Means for Solving the Problems

According to a first embodiment of the present invention, there is provided a stretch-blow-formed polyester container having an average thickness in a body portion of not more than 280 μm, wherein in a measurement of dynamic viscoelastic properties at a central portion of a body portion in an axial direction thereof, a tan δ peak value is 0.23 to 0.29, and a tan δ peak temperature at the peak value is 111 to 118° C.

According to a second embodiment of the present invention, there is provided a stretch-blow-formed polyester container having an average thickness in the body portion of not more than 280 μm, wherein in a measurement of dynamic viscoelastic properties at a central portion of a body portion in an axial direction thereof, a tan δ peak value is less than 0.25, and a tan δ peak temperature at the peak value is not lower than 119° C.

In the stretch-blow-formed polyester container of the present invention, it is desired that:

1. The central portion of the body portion has a degree of crystallinity in a range of 29 to 38% as measured by the density method; and
2. The container is for use for being filled at a high temperature.

According to the present invention, further, there is provided a method of producing the stretch-blow-formed polyester container of the above second embodiment, comprising stretching a polyester preform heated at a stretching temperature by using a stretch rod and by blowing an air, followed by the heat-set, wherein the stretching temperature is in a range of 100 to 130° C., the temperature of the air that is blown is adjusted to be in a range of 80 to 200° C., and the temperature of the mold during the heat-set is in a range of 130 to 160° C.

In the above method of production, it is desired that blowing the air comprises a pre-blowing that is executed simultaneously with the stretching by using the stretch rod and a main blowing that is executed just at the end of the stretching by using the stretch rod, the temperature of the air that is blown being adjusted to be in a range of 80 to 200° C. in both the pre-blowing and the main blowing.

Effects of the Invention

Despite the body portion has an average thickness of as small as not more than 280 µm, the stretch-blow-formed polyester container of the present invention has excellent resistance against the heat and is effectively prevented from being deformed by heat even when it has received a thermal hysteresis of being filled with the content at a temperature of not lower than 80° C. and, specifically, at 83 to 87° C. and, thereafter, the temperature therein is lowered.

Despite the body portion has an average thickness of as small as not more than 280 µm, the stretch-blow-formed polyester container of the present invention has excellent resistance against the heat and is effectively prevented from being deformed by heat even when it has received a thermal hysteresis of being filled with the content at a temperature of not lower than 80° C. and, specifically, at 83 to 87° C. and, thereafter, the temperature therein is lowered.

That is, in the measurement of dynamic viscoelastic properties, the stretch-blow-formed polyester container according to the first embodiment of the present invention has such properties as a tan δ peak value of 0.23 to 0.29, and a tan δ peak temperature at the peak value of 111 to 118° C. Namely, when filled with the content at a high temperature, the stretch-blow-formed polyester container positively develops a thermal deformation (thermal expansion) to a certain extent. Therefore, when the container shrinks (to absorb by reduced pressure) due to the subsequent reduction in the pressure as a result of cooling, a suitable balance is maintained between the thermal expansion at the time of when heated at a high temperature and the absorption by reduced pressure when cooled. Finally, therefore, the container effectively alleviates the deformation.

Referring, for example, to Experimental Example 1 that will be described later, the blow-formed polyester container (empty container) of the first embodiment of the present invention was held in an oven heated at 85° C. for 5 minutes and was cooled down to room temperature (23° C.). In this case, a rate of change of the container was 0.4 to 0.8% with the volume of the container of before heated in the oven as a reference. This value was larger than 0.3% or lower of the conventional containers, meaning that the container of the present invention could be thermally expanded when filled with the content at a high temperature. Thereafter, the container was cooled, and the amount of shrinkage (amount of absorbing by reduced pressure) due to a reduction in the pressure was the same as that of the conventional containers. Therefore, the amount of shrinkage of the container of the present invention from the amount of before being filled is smaller than the amount of shrinkage of the conventional container that thermally expands little. Thus a good balance is maintained between the thermal expansion and the absorption by reduced pressure, and the container is effectively prevented from being deforming after it has been filled with the content.

In the stretch-blow-formed polyester container according to the second embodiment of the present invention, a tan δ peak value is less than 0.25 in the measurement of dynamic viscoelastic properties at the central portion of the body portion in the axial direction thereof. This means that the amorphous portion is in a state where the stress of the molecular chains has been relaxed. Here, further, a tan δ peak temperature at the peak value is not lower than 119° C. This means that the ratio of the amorphous portion is small, and the degree of crystallinity (orientation due to stretching) is high. From the above facts, therefore, it will be learned that the stretch-blow-formed polyester container of the second embodiment of the present invention has excellent resistance against the heat even in a state of having a small thickness.

In the above-mentioned method of production, the air of a high temperature is blown starting from the initial stage of blow-forming, whereby the container is heated from the side of the inner surface to relax the strain in the container on the side of the inner surface, promoting the self-heating of the container, promoting the orientation and crystallization, and improving the resistance against the heat. As a result, it is made possible to stretch-blow-form a polyester container having the above-mentioned properties.

The above-mentioned actions and effects of the invention will also become obvious from the results of Experimental Example 2 that will be described later.

That is, polyester containers were stretch-blow-formed under the same stretching conditions as those of Experimental Example 1 but without blowing the heated air. In this case, the tan δ peak temperatures were not higher than 118° C. and the tan δ peak values were not less than 0.25 indicating that the containers were inferior in their resistance against the heat (Comparative Examples 1 to 3). On the other hand, the polyester containers were also stretch-blow-formed by blowing the air heated at a temperature in a range of 80 to 200° C. since the stage of pre-blowing. In this case, the tan δ peak temperatures and the tan δ peak values were within the above-mentioned ranges, and the containers all possessed excellent resistance against the heat (Examples 1 to 6).

MODES FOR CARRYING OUT THE INVENTION (Stretch-Blow-Formed Polyester Container)

Figure 1:
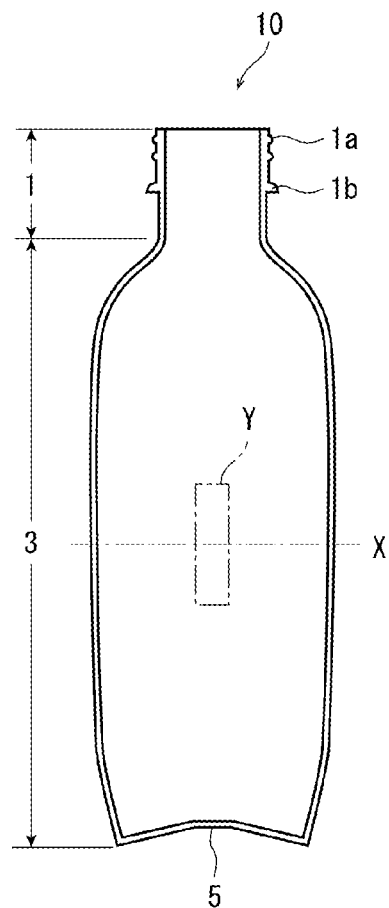
FIG. 1 It is a schematic side view of a stretch-blow-formed polyester container of the present invention.

A stretch-blow-formed polyester container of the present invention, as shown in FIG. 1, is generally designated at 10, has a neck portion 1 and a body portion 3 continuing to the neck portion 1, and has the lower end of the body portion 3 closed with a bottom portion 5.

The blow-formed polyester container 10 of this form is produced by forming a preform of the shape of a test tube by the injection-forming or the like forming, blow-forming the preform, and then heat-setting the preform in a suitable temperature range. Details of the production method, however, will be described later.

The neck portion 1 is an unstretched portion (portion fixed by a mold during the blow-forming) and on the outer surface thereof, there is formed a suitable screw thread 1a depending on the form of a cap fitted to the container. Under the screw thread 1a, there is formed a support ring 1b for supporting and transporting the preform or the container that is formed.

The body portion 3 (and the bottom portion 5), on the other hand, are portions to be stretched by blowing. Namely, these portions are stretch-formed by blowing the fluid in a state where the neck portion 1 of the preform is fixed.

Further, to impart the container with a capability to absorb by reduced pressure at the time of filling at a high temperature, the bottom portion 5 is in a raised shape as shown FIG. 1; i.e., the bottom surface is dented.

The stretch-blow-formed polyester container 10 of the present invention has the form as mentioned above, has a reduced thickness, and the body portion 3 which is the stretch-formed portion has an average thickness of not more than 280 µm, preferably, in a range of 270 to 200 µm, and more preferably, 250 to 200 µm. The weight has also been reduced as a result of reducing the thickness.

In the stretch-blow-formed polyester container of the first embodiment of the present invention having the reduced thickness, it is important that a tan δ peak value is in a range of 0.23 to 0.29, and a tan δ peak temperature at the peak value is in a range of 111 to 118° C. in the measurement of dynamic viscoelastic properties (also called DMS or DMA) at the central portion X of the body portion in the axial direction thereof. Or in the stretch-blow-formed polyester container of the second embodiment, it is important that a tan δ peak value is less than 0.25 and, specifically, in a range of 0.18 to less than 0.25 and, particularly, 0.22 to less than 0.25, and a tan δ peak temperature at the peak value is not lower than 119° C. and, specifically, in a range of 119 to 125° C.

Measuring the dynamic viscoelastic properties is to measure the mechanical properties of a sample by measuring the stress or strain, and tan δ is a parameter called loss tangent and is expressed as a ratio of loss modulus of elasticity/storage modulus of elasticity. The loss modulus of elasticity is a loss due to an amorphous portion while the storage modulus of elasticity is a modulus of elasticity due to a crystalline portion, which are both dependent upon the temperature. The temperature at which the tan δ becomes a peak represents an apparent glass transition point.

Therefore, the smaller the tan δ peak value, the larger the number of the crystalline portions that are present and the higher the peak temperature that represents the peak value, the higher the glass transition point. Namely, the container is not deformed when it is filled with the content at a high temperature; i.e., the container is highly resistant against the heat.

On the other hand, upon setting the tan δ peak value and the tan δ peak temperature as in the case of the stretch-blow-formed polyester container of the first embodiment of the present invention, the thermal deformation (or thermal expansion) is promoted when the container is filled with the content at a high temperature. In this case, however, it becomes allowable to decrease the required amount of shrinkage from the amount of the container of before it is filled as a result of a decrease in the temperature (as a result of being cooled down to room temperature) after the container has been filled the content at a high temperature. Upon maintaining the balance between the thermal deformation (thermal expansion) and the shrinkage, therefore, it is made possible to effectively suppress the deformation of the container that is caused when the container is filled with the content at a high temperature.

That is, the stretch-blow-formed polyester container of the first embodiment undergoes the thermal deformation and expands to some extent when it is filled with the content at a high temperature. The conventional blow-formed thick heat-resistant polyester containers (conventional heat-resistant containers) are not thermally expanded when they are filled as much as the blow-formed container of the present invention because they have large thicknesses. However, the amount of absorbing by reduced pressure due to the cooling after having been filled is the same. Therefore, the amount of shrinkage of the container of from before it is filled is smaller in the case of the blow-formed container of the present invention than in the case of the conventional heat-resistant containers. Therefore, the conventional heat-resistant containers have been designed to withstand the deformation caused by the absorption by reduced pressure in order to suppress the deformation after the containers have been filled with the content at a high temperature. Unlike the conventional heat-resistant containers, on the other hand, the stretch-blow-formed polyester container according to the first embodiment of the present invention is designed to well maintain a balance between the thermal expansion and the absorption of pressure reduction. Namely, the container of the invention effectively suppresses itself from being deformed after it is filled with the content at a high temperature.

In the thin container as that of the present invention, further, if the tan δ peak value and the tan δ peak temperature lie outside the above-mentioned ranges, then the balance is lost between the thermal expansion of when the container is filled with the content at a high temperature and the shrinkage due to the subsequent decrease of temperature. As a result, the container cannot be effectively prevented from being deformed when it is filled with the content at a high temperature.

To measure the tan δ peak value and the tan δ peak temperature, a test piece is prepared by cutting out the body portion of the container in a suitable size so as to include the central portion X of the body portion in the axial direction. Then by using a viscoelastic spectrometer, a load is exerted on the test piece from the axial direction of the container to take measurements.

The stretch-blow-formed polyester container of the first embodiment of the present invention undergoes the thermal deformation to some extent when it is filled with the content at a high temperature. To secure stability in the shape against the thermal deformation, therefore, the bottom portion 5 is raised as shown in FIG. 1 and the bottom surface is formed in a dented shape. When the container is thermally deformed (expanded), therefore, the central portion of the bottom portion 5 is lowered to relax the stress caused by the thermal expansion. Therefore, the container can be held in an erected state.

The stretch-blow-formed container of the present invention is made from a polyester that can be formed into a preform thereof through an injection forming or a compression forming. As the polyester, there is, usually, preferably used a polyethylene terephthalate (PET) prepared from a terephthalic acid and an ethylene glycol.

The polyethylene terephthalate, usually, has a glass transition point (Tg) in a range of 50 to 90° C. and, specifically, 55 to 80° C., and a melting point (Tm) in a range of 200 to 275° C. and, specifically, 220 to 270° C.

There can be also preferably used a copolymerized polyester containing ester units derived from the dibasic acids other than the terephthalic acid or the diol units other than the ethylene glycol under a condition in which the ethylene terephthalic units occupy not less than 70 mol % and, specifically, not less than 80 mol % of recurring ester units. As the dibasic acids other than the terephthalic acid, there can be exemplified aromatic dicarboxylic acids such as isophthalic acid, phthalic acid and naphthalenedicarboxylic acid; alicyclic dicarboxylic acids such as cyclohexanedicarboxylic acid and the like acid; and aliphatic dicarboxylic acids such as succinic acid, adipic acid, sebacic acid and dodecanedioic acid, which may be used in one kind or in a combination of two or more kinds. As the diol components other than the ethylene glycol, there can be exemplified propylene glycol, 1,4-butanediol, diethylene glycol, 1,6-hexylene glycol, cyclohexanedimethanol, and ethylene oxide adduct of bisphenol A, which may be used in one kind or in two or more kinds.

The polyester should have a molecular weight which is at least large enough to form a film, and is, usually, of an injection grade having an intrinsic viscosity (I.V.) in a range of 0.6 to 1.4 dL/g and, specifically, 0.63 to 1.3 dL/g.

The polyester may be, further, blended with a known blending agent (antioxidant, lubricant, etc.) so far as it maintains the above-mentioned dynamic viscoelastic properties. Or, the wall of the container may assume a multi-layered structure comprising an inner layer and an outer layer of the polyester, and an intermediate layer which is an oxygen-barrier layer or an oxygen-absorbing layer that is provided between them via adhesive layers.

The oxygen-barrier layer in the above multi-layered structure is formed of, for example, an oxygen-barrier resin such as ethylene-vinyl alcohol copolymer or polyamide. Here, the oxygen-barrier resin may be blended with any other thermoplastic resin so far as its oxygen-barrier property is not impaired.

Further, the oxygen-absorbing layer is a layer that contains an oxidizing polymer and a transition metal catalyst as described in JP-A-2002-240813. The oxidizing polymer is oxidized with oxygen due to the action of the transition metal catalyst, whereby oxygen is absorbed to interrupt the permeation of oxygen. The oxidizing polymer and the transition metal catalyst have been closely described in the above JP-A-2002-240813. Therefore, though not described here in detail, typical examples of the oxidizing polymer include olefin resins having tertiary carbon atoms (e.g., polypropylene, polybutene-1, and copolymers thereof); thermoplastic polyester and aliphatic polyamide; xylylene group-containing polyamide resin; and ethylenically unsaturated group-containing polymer (e.g., polymer derived from a polyene such as butadiene).

Further, typical examples of the transition metal catalyst include inorganic salts of transition metals such as iron, cobalt, nickel, etc., organic acid salts thereof and complexes thereof.

Adhesive resins used for adhering the layers have been known per se., such as carboxylic acid like maleic acid, itaconic acid or fumaric acid, or an anhydride thereof; olefin resin graft-modified with amide or ester; ethylene-acrylic acid copolymer; ionically crosslinked olefin copolymer; and ethylene-vinyl acetate copolymer.

The thicknesses of the above-mentioned layers may be suitably set so far as the body portion of the container wall after it has been blow-formed has an average thickness that lies within the above-mentioned range (not more than 280 μm).

It is, further, allowable to provide a reground resin layer formed by using a blend of a virgin polyester resin and the scrap that generates when the container is blow-formed.

(Method of Producing a Stretch-Blow-Formed Polyester Container)

The stretch-blow-formed polyester container of the present invention is produced by using a preform that is formed through the injection forming or the like forming, and by subjecting the preform to the steps of stretch-blow forming and the heat-set to stretch the body portion and reduce the thickness of the body portion so that the average thickness of the body portion is not more than 280 μm. Here, the conditions must be so set that the above-mentioned dynamic viscoelastic properties are satisfied.

For example, if the stretching ratio is high, the tan δ peak value tends to become small and the tan δ peak temperature tends to become high. If the temperature of the air that is blown is high, the tan δ peak value tends to become small and the tan δ peak temperature tends to become high. Further, if the temperature of the heat-set is high, the tan δ peak value tends to become small and the tan δ peak temperature tends to become high. By utilizing these properties, therefore, experiments should be conducted in advance on a laboratory scale so that the dynamic viscoelastic properties (tan δ peak value and tan δ peak temperature) will lie within predetermined ranges, and the conditions should be determined depending on the thickness of the stretch-formed portion of the preform (that corresponds to the body portion of the container).

[Preform]

Referring to the preform used for forming the stretch-blow-formed polyester container of the present invention, the polyester can be formed in a single-layer structure or a multilayered structure by, for example, the injection forming or the compression forming. It is, here, desired that the neck portion of the preform that is formed is heated and is thermally crystallized from the standpoint of resistance against the heat.

[Heating process of preform]

The preform that is formed is heated at a stretching temperature before being subjected to the stretch-blow forming. In the case of the stretch-blow-formed polyester container of the first embodiment of the present invention, it is desired that the outer surface of the preform is heated at a temperature in a range of 100 to 140° C. and, specifically, 120 to 135° C. In the case of the stretch-blow-formed polyester container of the second embodiment of the present invention, it is desired that the outer surface of the preform is heated at a temperature in a range of 100 to 130° C. If the temperature on the outer surface of the preform is higher than 140° C., then the preform may be whitened due to the thermal crystallization. If the stretching temperature is lower than the above-mentioned range, on the other hand, then the preform may not be stretched to a sufficient degree in the subsequent step of biaxial stretch-blow forming.

The preform can be heated by a conventional method. Usually, the preform of normal temperature is subjected to the main heating by using an infrared-ray heater and an inner surface heater in combination. Here, by taking the cooling during the transit of the preform into account, the preform is heated again at the time of blow forming so that the temperature thereof lies within the above-mentioned temperature range.

[Step of Biaxial Stretch-Blow Forming]

In the step of biaxial stretch-blow forming, the preform that is evenly heated at a high temperature under the above-mentioned heating conditions is put into a mold for blow forming with its neck portion being fixed. In this state, the preform is stretched in the axial direction (vertical direction) by using a stretch rod. At the same time, the air is blown therein to stretch the preform in the circumferential direction (radial direction). The preform then comes in contact with the surface of the mold and is shaped into the form of a final product.

As the blow-forming means, there has been known a two-step blowing method according to which a formed body of an intermediate shape is once blow-formed, the formed body of the intermediate shape is then heated and is, thereafter, secondarily blow-formed into a final formed body. To form the blow-formed container of the first embodiment of the present invention, however, the two-step blowing method is not suited, but the ordinary one-step blow-forming method is adapted. This is because if the container is formed by the two-step blowing method, then the orientation and crystallization are promoted due to the blow-stretching. As a result, it becomes difficult to adjust the tan δ peak value and the tan δ peak temperature to lie within the above-mentioned ranges.

When the stretch-blow-formed polyester container of the first embodiment of the invention is to be formed, there is no specific limitation on the air that is blown. When the stretch-blow-formed polyester container of the second embodiment is to be formed, however, it is desired to blow the air of which the temperature is adjusted to be 80 to 200° C. and, specifically, 145 to 200° C. So far as the air is blown being heated at a temperature in the above-mentioned range, the blow-forming can be continued until the article is finally formed even after the stretch-forming by using the stretch rod is finished without the need of changing the rate of blowing the air. Desirably, however, it is recommended that a pre-blowing of the air is executed at a small blowing rate until the stretching by using the stretch rod is finished and at a moment the stretching by using the stretch rod is finished, a main blowing of the air is executed at a blowing rate larger than that of the pre-blowing.

Figure 2:
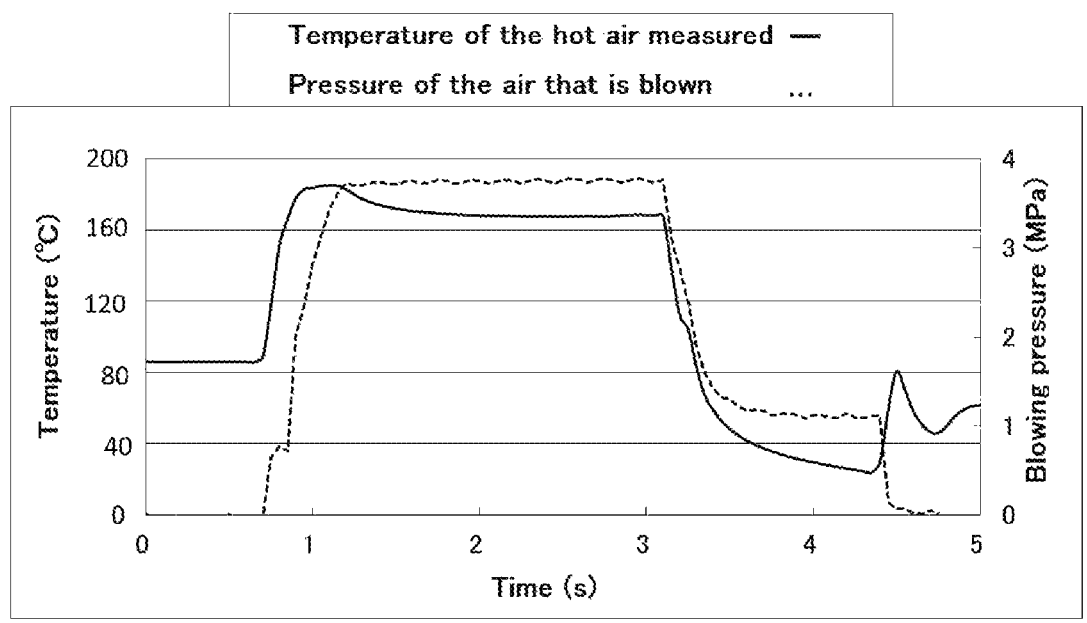
FIG. 2 It is a diagram illustrating a relationship between the temperature of the air that is blown and the blowing pressure with the lapse of time in the step of biaxial stretch-blow forming in a method of producing a stretch-blow-formed polyester container according to a second embodiment of the present invention.

FIG. 2 is a diagram illustrating a relationship between the temperature of the air that is blown and the pressure with respect to the lapse of time in the step of biaxial stretch-blow forming for producing a stretch-blow-formed polyester container according to the second embodiment of the present invention. Roughly speaking, the blowing step shown in FIG. 2 includes a pre-blowing step (0.02 to 0.6 seconds) where the air to be blown flows in at a small rate and the blowing pressure is in a range of 0.5 to 2 MPa, a main blowing step (0.6 to 3 seconds) where the blowing pressure is in a range of 2 to 4 MPa, and a cooling step where after the main blowing is finished, the cooling air flows in to cool the container.

In the present invention, the air adjusted at a temperature of 80 to 200° C. is being blown in the pre-blowing step, too. Therefore, the preform can be evenly and efficiently stretched in the axial direction by using the stretch rod without permitting a decrease in the temperature of the preform that has been heated at the stretching temperature. Moreover, the air of a high temperature is blown in the main blowing step, too, making it, therefore, possible to release the strain in the inner surface of the container that is being formed. Being compounded by the heating from the outer surface due to the heat-set that will be described later, therefore, it is allowed to further improve the resistance against the heat. Moreover, since the air still maintaining the high temperature is blown in with a relatively high pressure, there is no need of lengthening the cycle for stretch forming for securing the resistance against the heat; i.e., the resistance against the heat can be improved even by the heat generated by the container by itself.

The stretching ratios in the step of biaxial stretch-blow forming are, desirably, 1.8 to 3.4 times in the vertical direction, 2.8 to 3.8 times in the circumferential direction and 4 to 12 times in terms of the area. This enables the body portion to assume an average thickness of as small as not more than 280 μm, and there can be obtained a finally formed article that is light in weight.

[Step of Heat-Set]

The container after blow-formed is subjected to the heat-set followed by cooling to complete the finally formed article.

As the heat-set, there have been known a one-mold method in which the container is heat-set simultaneously with the blow-forming by using a mold for blow-forming, and a two-mold method in which the container that is blow-formed is taken out from the mold for blow forming, and is heated again by using a mold dedicated for the heat-set. The blow-formed container of the first embodiment of the present invention can be formed, desirably, by the one-mold method which executes the forming in a short period of time. With the two-mold method, the blow-formed article is once cooled and is, thereafter, heated. In this case, therefore, the heating time becomes long, and it becomes difficult to set the heating temperature for forming the container of the present invention.

To attain the heat-set by the one-mold method, the heating temperature is so set as to satisfy predetermined dynamic viscoelastic properties (tan δ) depending on the stretching temperature (preform temperature) and the stretching ratios. To obtain the stretch-blow-formed polyester container of the first embodiment of the present invention, the heat-set temperature may be not lower than 130° C. but lower than 150° C., and the heat-set time may be several seconds. For instance, when a heat-resistant blow-formed container having an ordinary thickness is to be produced, the heat-set temperature is not lower than 150° C., which is higher than the range of the heat-set temperature employed by the present invention.

To obtain the stretch-blow-formed polyester container of the second embodiment of the present invention, on the other hand, the heat-set temperature may be higher than that of the case of the stretch-blow-formed container of the first embodiment. In this case, the heat-set temperature is in a range of 130 to 160° C., and the heat-set time may be several seconds.

As described above, the stretch-blow-formed polyester container of the present invention exhibits excellent resistance against the heat when the central portion X of the body portion thereof has a degree of crystallinity in a range of 29 to 38% as measured by the density method and, specifically, in a range of 30 to 35% in the case of the first embodiment, and in a range of 35 to 38% in the case of the second embodiment.

Further, the stretch-blow-formed polyester container of the present invention has a very small thickness, and weighs not more than 22 g in the case of a bottle of a full volume of 500 mL, weighs not more than 49 g in the case of a bottle of a full volume of 2 L in contrast with the weight of not less than 28 g in the case of a commercially available PET bottle of a volume of 500 mL and the weight of not less than 65 g in the case of a commercially available PET bottle of a volume of 2 L. Therefore, the present invention realizes a considerable reduction in the weight owing to the reduced thickness.

EXAMPLES

The invention will now be described based on the following Experimental Examples.

Described below are the methods of measurements employed by the following Experimental Examples.

(1) Tan δ in the measurement of dynamic viscoelastic properties.

With reference to FIG. 1, a test piece Y was cut out from the central portion X of the body portion of the bottle, the test piece Y measuring 5 mm×40 mm with its direction of long side being the direction of height of the bottle. The test piece Y was then measured for its dynamic viscoelastic properties by using a viscoelasticity spectrometer (EXSTAR6000DMS: Seiko Instruments Co.). The measuring conditions were as described below. From the obtained tan δ curve (plotting the temperatures on the abscissa and the tan δ values on the ordinate), there were derived a maximum value of tan δ (tan δ value) and a maximum temperature of tan δ (peak temperature).

Measuring mode: tensile sinusoidal wave mode
Gauge length of the test piece: 20 mm
Number of vibrations: 1 Hz
Minimum tensile force: 100 mN
Temperature-elevation profile: Temperature was elevated from 25° C. to 210° C. at a rate of 2° C/min.

(2) Measuring the rate of change.

The bottle was held in an oven heated at 85° C. for 5 minutes, and was cooled down to room temperature (23° C.). The volume of the container was measured before it was heated in the oven and after it was cooled, and a rate of change of the container was found with the volume of the container before it was heated as a reference.

(3) Measuring the average thickness.

The bottle was measured for its thickness at 6 points in the circumferential direction for every 20 mm in the vertical direction to find an average value of the thickness.

(4) Measuring the resistance against the heat.

The empty bottle was filled with water heated at 87° C., placed in a shower of water heated at 77° C. for 5 minutes, and was left to cool. Thereafter, the container was observed for its deformation with the eye.

Deformation was small: ◉
Deformation was intermediate: ○
Deformation was large: Δ
Deformation was so large that the container could not be accepted as a product: ×

Experimental Example 1

The following bottles formed under the conditions shown in Table 1 were measured for their dynamic viscoelastic properties. The results were as shown in FIG. 3 which also shows the degrees of crystallinity of the bottles of the present invention.

TABLE 1

|  | PF-heating temperature (° C.) | Temperature of the final blow-form mold (° C.) | Temperature of the air that is blown (° C.) |
|---|---|---|---|
| Bottles of the invention | 115-130 | 130-145 | 10-50 |
| Thick heat-resistant bottles | 100-110 | 150-155 | 10-50 |
| Two-step blow-formed bottles | 100-110 | 150-160 | 10-50 |
| Heat- and pressure-resistant bottles | 100-110 | 30-60 | 10-50 |

Figure 3:
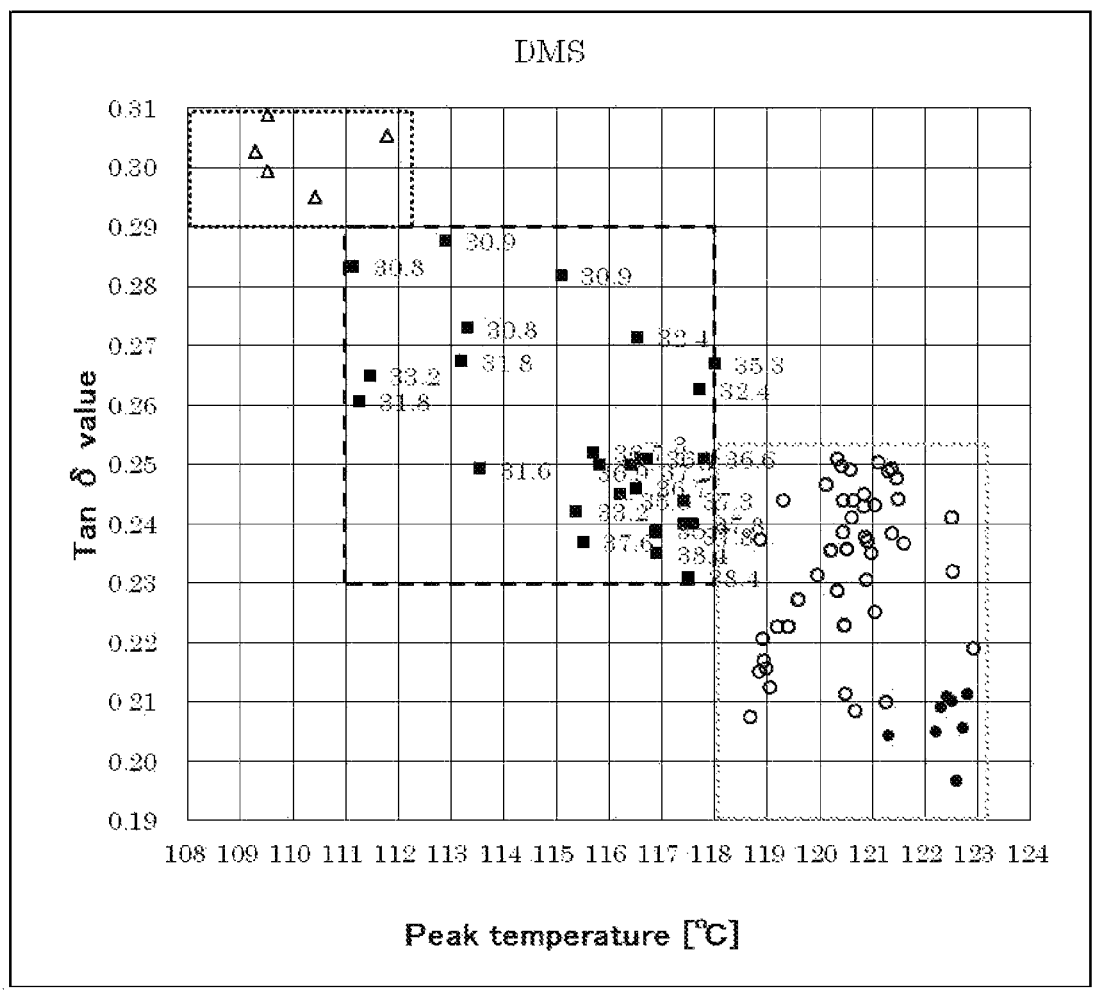
FIG. 3 It is a diagram showing the results of dynamic viscoelastic properties of the bottles measured in the Experimental Example 1.

In FIG. 3, symbols ■, ○, ● and Δ represent the bottles in the Table 1 above, i.e., the following bottles.

■: Bottles of the present invention (bottles for filling at high temperatures).

○: Thick heat-resistant bottles (conventional bottles for filling at high temperatures).

●: Two-step blow-formed bottles (bottles blow-formed twice for filling at high temperatures).

Δ: Heat- and pressure-resistant bottles (bottles for carbonated beverages and sterilized after having been filled, not suited for being filled at high temperatures).

Further, the 500-ml bottles of the present invention and the thick heat-resistant bottles were measured for their rates of change. The results were as shown in Table 2. Here, when it was attempted to form the PF for forming the bottle of the present invention under the same conditions as those for the thick heat-resistant bottles, the PF underwent thermal deformation and could not be formed into a bottle. Therefore, there was not formed a thin heat-resistant bottle having dynamic viscoelastic properties that fell outside the range of the present invention.

TABLE 2

|  | Weight of 500-ml empty bottle (g) | Average thickness of body portion (μm) | Rate of change (%) (vol. before heated − vol. after heated)/ vol. before heated × 100 |
|---|---|---|---|
| Bottle of the invention | 22 | 200-280 | 0.60 |
| Thick heat-resistant bottle | 28 | 285-350 | 0.23 |

From the above Experimental Example, it was confirmed that the bottle of the first embodiment of the present invention possessed a tan δ peak value in a range of 0.23 to 0.29 and a tan δ peak temperature at the above value in a range of 111 to 118° C. from the measurement of its dynamic viscoelastic properties, and underwent the heat shrinking more easily than the conventional thick heat-resistant bottles. From the above results, it was learned that the bottle of the present invention possessed a larger rate of change than the conventional thick heat-resistant bottles. When filled with the content at a temperature of as high as 80° C. or more, the bottle of the present invention undergoes the thermal expansion more greatly. Here, the rate of change of the bottle due to a reduction in the pressure after cooled remains the same for the bottles of the same volume. Therefore, it will be learned that the amount of change due to a reduced pressure from that of the bottle of before being filled is smaller in the case of the bottle of the present invention. Accordingly, despite of having a reduced weight and a reduced thickness, the bottle of the present invention effectively prevents the deformation caused by thermal hysteresis such as of when the bottle is filled at a high temperature and, thereafter, the bottle is cooled down.

Experimental Example 2

Figure 4:
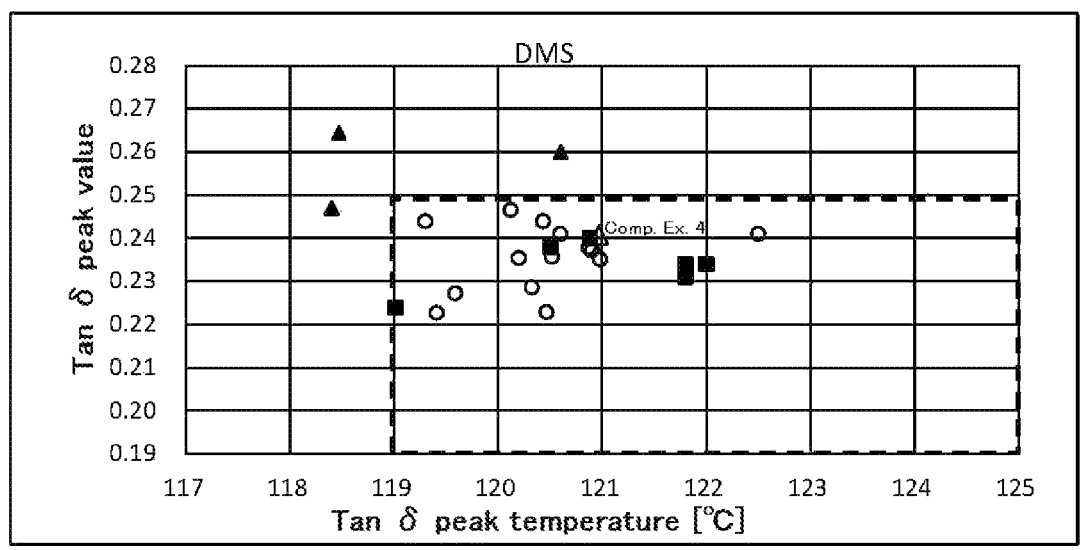
FIG. 4 It is a diagram showing the results of dynamic viscoelastic properties of the bottles measured in the Experimental Example 2.

Bottles (Examples, Comparative Examples) having sizes and formed under the forming conditions as shown in Table 3 were measured for their dynamic viscoelastic properties, average thicknesses in the body portions and resistance against the heat. The results were as shown in Table 3 and FIG. 4.

TABLE 3

| | Bottle size | Forming conditions | | | Average thickness of body portion (μm) | Dynamic viscoelasticity | | Evaluation Resistance against the heat |
|---|---|---|---|---|---|---|---|---|
| | | PF-heating temperature (° C.) | Temperature of the bottle-forming mold (° C.) | Temperature of the air that is blown (° C.) | | Tan δ peak value | Tan δ Peak temperature | |
| Ex. 1 | 500 ml | 120 | 145 | 180 | 240 | 0.22 | 119.0 | ⊚ |
| Ex. 2 | 500 ml | 106 | 150 | 145 | 260 | 0.23 | 121.8 | ⊚ |
| Ex. 3 | 500 ml | 106 | 150 | 115 | 260 | 0.23 | 121.8 | ○ |
| Ex. 4 | 500 ml | 106 | 150 | 85 | 260 | 0.24 | 120.5 | ○ |
| Ex. 5 | 2 L | 110 | 160 | 180 | 250 | 0.23 | 122.0 | ⊚ |
| Ex. 6 | 2 L | 110 | 155 | 145 | 250 | 0.24 | 120.9 | ○ |
| Comp. Ex. 1 | 500 ml | 106 | 150 | no heating | 260 | 0.25 | 118.4 | Δ |
| Comp. Ex. 2 | 2 L | 110 | 155 | no heating | 250 | 0.26 | 120.6 | X |
| Comp. Ex. 3 | 400 ml | 110 | 160 | no heating | 240 | 0.26 | 118.5 | Δ |
| Comp. Ex. 4 | 280 ml | 110 | 160 | no heating | 300 | 0.24 | 121.0 | ⊚ |

As will be learned from the above results, it was confirmed that favorable resistance against the heat was obtained when the tan δ peak value was in a range of less than 0.25 and the tan δ peak temperature was in a range of not lower than 119° C., and the resistance against the heat decreases as the values separate away from the above ranges. Specifically, when the average thickness of the bottle was not more than 250 μm, it was important that the temperature of the air that was blown had to be not lower than 145° C. Further, as will be learned from the Comparative Example 4, with the bottle having an average thickness of not less than 280 μm, the resistance against the heat did not decrease unlike the bottles having reduced thicknesses.

INDUSTRIAL APPLICABILITY

The stretch-blow-formed polyester container of the present invention is effectively suppressed from being deformed even when it is filled with the content at high temperatures. Therefore, the stretch-blow-formed polyester container of the present invention can be favorably used for containing non-carbonated beverages, such as various juices or various chemical solutions that are filled at temperatures of as high as not lower than 80° C. and, specifically, 83 to 87° C.

Moreover, since the thickness has been reduced to be not more than 280 μm and the weight has also been reduced, the stretch-blow-formed polyester container of the present invention contributes to saving resources and reducing the amounts of wastes, and is suited for being used as general-purpose articles that are to be produced in mass.

DESCRIPTION OF REFERENCE NUMERALS

1: neck portion
3: body portion
5: bottom portion
10: blow-formed container

The invention claimed is:

1. A stretch-blow-formed polyester container having an average thickness in a body portion of not more than 280 μm, wherein in a measurement of dynamic viscoelastic properties in an axial direction at a central portion of said body portion, a tan δ peak value is 0.23 to 0.29, and a tan δ peak temperature at said peak value is 111 to 118° C.

2. The stretch-blow-formed polyester container according to claim 1, wherein the central portion of said body portion has a degree of crystallinity in a range of 29 to 38% as measured by the density method.

3. The stretch-blow-formed polyester container according to claim 1, wherein the container is used for being filled at a high temperature.

4. A stretch-blow-formed polyester container having an average thickness in a body portion of not more than 280 μm, wherein in a measurement of dynamic viscoelastic properties in an axial direction at a central portion of said body portion, a tan δ peak value is less than 0.25, and a tan δ peak temperature at said peak value is not lower than 119° C.

5. A method of producing the stretch-blow-formed polyester container described in the claim 4, comprising stretching a polyester preform heated at a stretching temperature by using a stretch rod and by blowing an air, followed by the heat-set, wherein said stretching temperature is in a range of 100 to 130° C., the temperature of the air that is blown is adjusted to be in a range of 80 to 200° C., and the temperature of the mold during the heat-set is in a range of 130 to 160° C.

6. The method of producing the stretch-blow-formed polyester container according to claim 5, wherein blowing the air comprises a pre-blowing that is executed simultaneously with the stretching by using the stretch rod and a main blowing that is executed just at the end of the stretching by using the stretch rod, the temperature of the air that is blown being adjusted to be in a range of 80 to 200° C. in both the pre-blowing and the main blowing.

* * * * *